Figure 1:
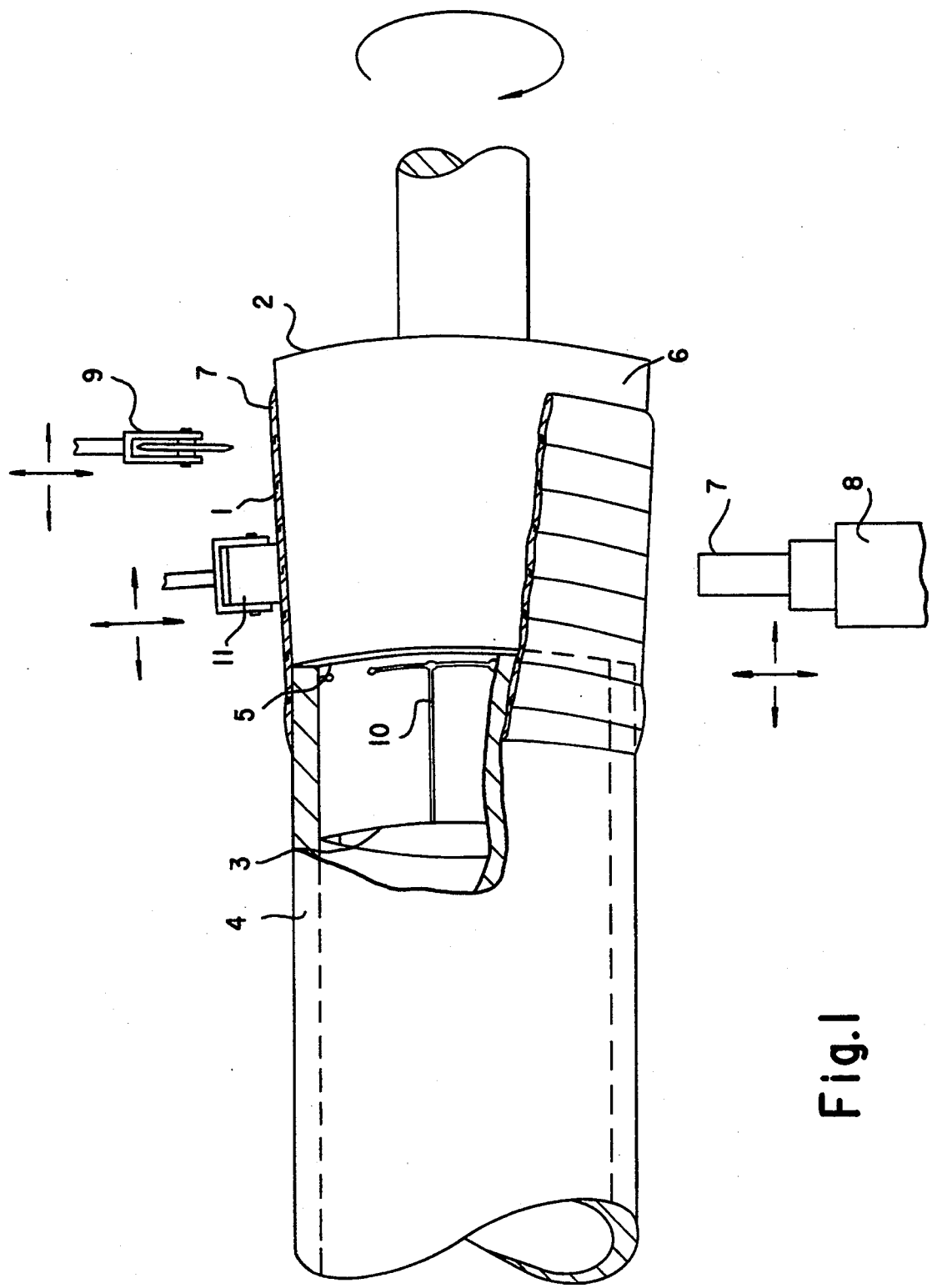

United States Patent [19]

Sundqvist et al.

[11] Patent Number: 5,411,619
[45] Date of Patent: May 2, 1995

[54] METHOD FOR MANUFACTURING A JOINT PIPE

[75] Inventors: Kristian Sundqvist, Nykarleby; Gunnar Blomqvist, Helsingby, both of Finland

[73] Assignee: OY KWH Pipe AB, Vasa, Finland

[21] Appl. No.: 122,487

[22] PCT Filed: Apr. 29, 1992

[86] PCT No.: PCT/FI92/00130

§ 371 Date: Oct. 1, 1993

§ 102(e) Date: Oct. 1, 1993

[87] PCT Pub. No.: WO92/19438

PCT Pub. Date: Nov. 12, 1992

[30] Foreign Application Priority Data

Apr. 30, 1991 [FI] Finland .................................. 912101

[51] Int. Cl.⁶ .................... B29C 53/62; B29C 53/82
[52] U.S. Cl. ...................... 156/187; 138/109; 156/189; 156/195; 156/244.13; 156/244.27; 156/267
[58] Field of Search ............... 156/91, 172, 173, 187, 156/189, 193, 195, 244.13, 244.15, 244.24, 244.27, 267; 285/423, 293, 374, 399; 138/154, 109

[56] References Cited

U.S. PATENT DOCUMENTS

| | | | |
|---|---|---|---|
| 2,383,582 | 8/1945 | Barbehenn ........................... | 156/215 |
| 3,240,645 | 3/1966 | Friedwald et al. ................... | 156/195 |
| 3,243,328 | 3/1966 | Britton et al. | |
| 3,466,383 | 9/1969 | Decker ................................ | 285/374 |
| 3,706,624 | 12/1972 | Rinker ................................ | 156/189 |
| 3,969,170 | 7/1976 | Landgraf ............................ | 156/195 |
| 4,062,717 | 12/1977 | McClean ............................ | 156/172 |
| 4,724,111 | 2/1988 | Iwata et al. ........................ | 264/155 |
| 4,826,423 | 5/1989 | Kemp et al. ...................... | 156/244.13 |

FOREIGN PATENT DOCUMENTS

| | | | |
|---|---|---|---|
| 2824968 | 12/1979 | Germany ........................... | 156/189 |
| 365747 | 4/1974 | Sweden . | |
| 1314404 | 4/1973 | United Kingdom ........... | 156/244.15 |
| 2232920 | 1/1991 | United Kingdom . | |

OTHER PUBLICATIONS

Webster's II New Riverside University Dictionary, 1984, p. 1261.

Primary Examiner—Steven D. Maki
Attorney, Agent, or Firm—Armstrong, Westerman, Hattori, McLeland & Naughton

[57] ABSTRACT

A method for manufacturing a joint pipe from a spirally wound thermoplastic profile is described in which the pipe end to be furnished with a joint pipe is pushed onto a rotatably driven, slightly conical mandrel, after which a melt profile of thermoplast is extruded and spirally wound in overlapping wraps around the mandrel and the pipe end in a direction extending from a point furthest from the pipe end, followed by cooling of the joint pipe, cutting of its end surface, and removal of the pipe end from the mandrel.

8 Claims, 3 Drawing Sheets

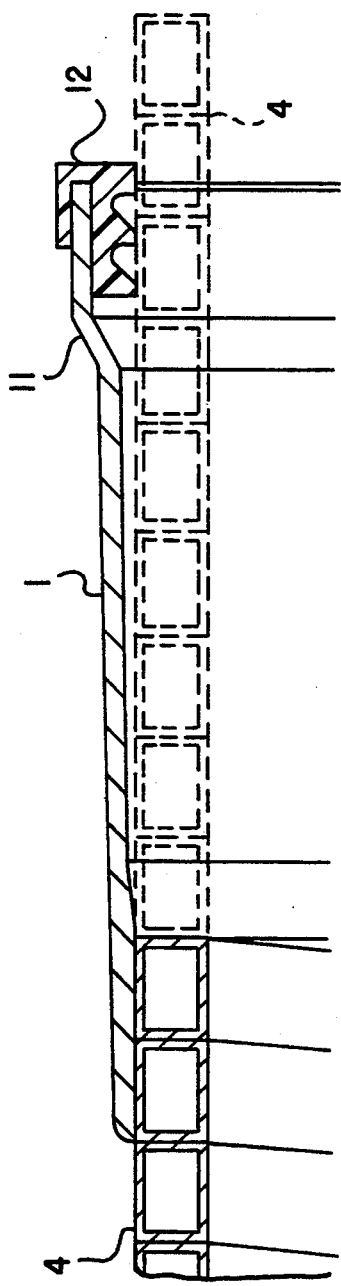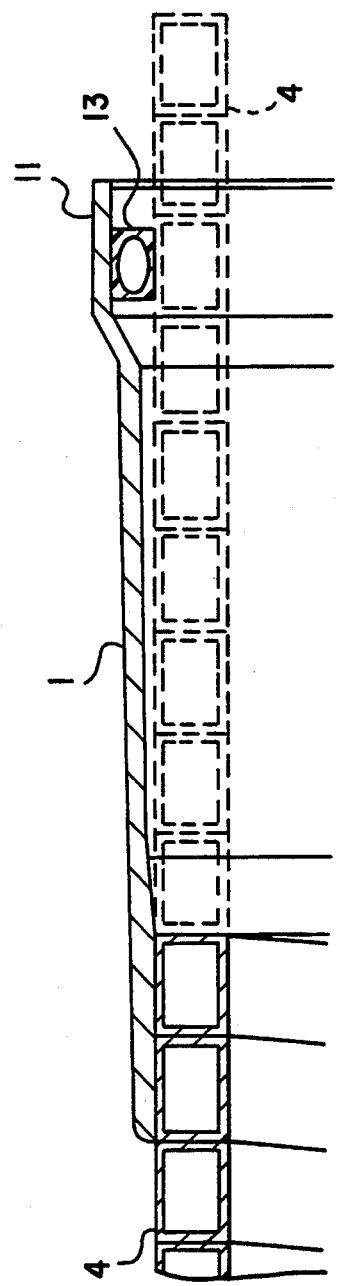

METHOD FOR MANUFACTURING A JOINT PIPE

The present invention relates to a method for manufacturing a joint pipe from a spirally wound thermoplastic profile at an end of a thermoplastic pipe.

The invention is characterized by the following steps:
the pipe end is pushed onto a rotatably driven, heated mandrel comprising a substantially cylindrical end section corresponding to the inner diameter of the pipe end, which end section transfers via a radial stop surface corresponding to the wall thickness of the pipe end into a slightly weakly conical section, a melt profile made of thermoplastic material is extruded spirally with an overlapping around the conical section of the mandrel commencing from that end of the mandrel, which is furtherest removed from the pipe end, and continuing inwardly forward and over the pipe end, when a desired overlapping degree between the extruded joint pipe and the pipe end is reached, the extruder is stopped while the mandrel and pipe continuously rotate, cooling water is sprayed from the outside over the extruded joint pipe, the free end of the joint pipe is cut uniform by means of a rotating knife, and the pipe end with the completed joint pipe is removed from the mandrel.

Other characteristics of the invention are described hereinafter.

Figure 2:
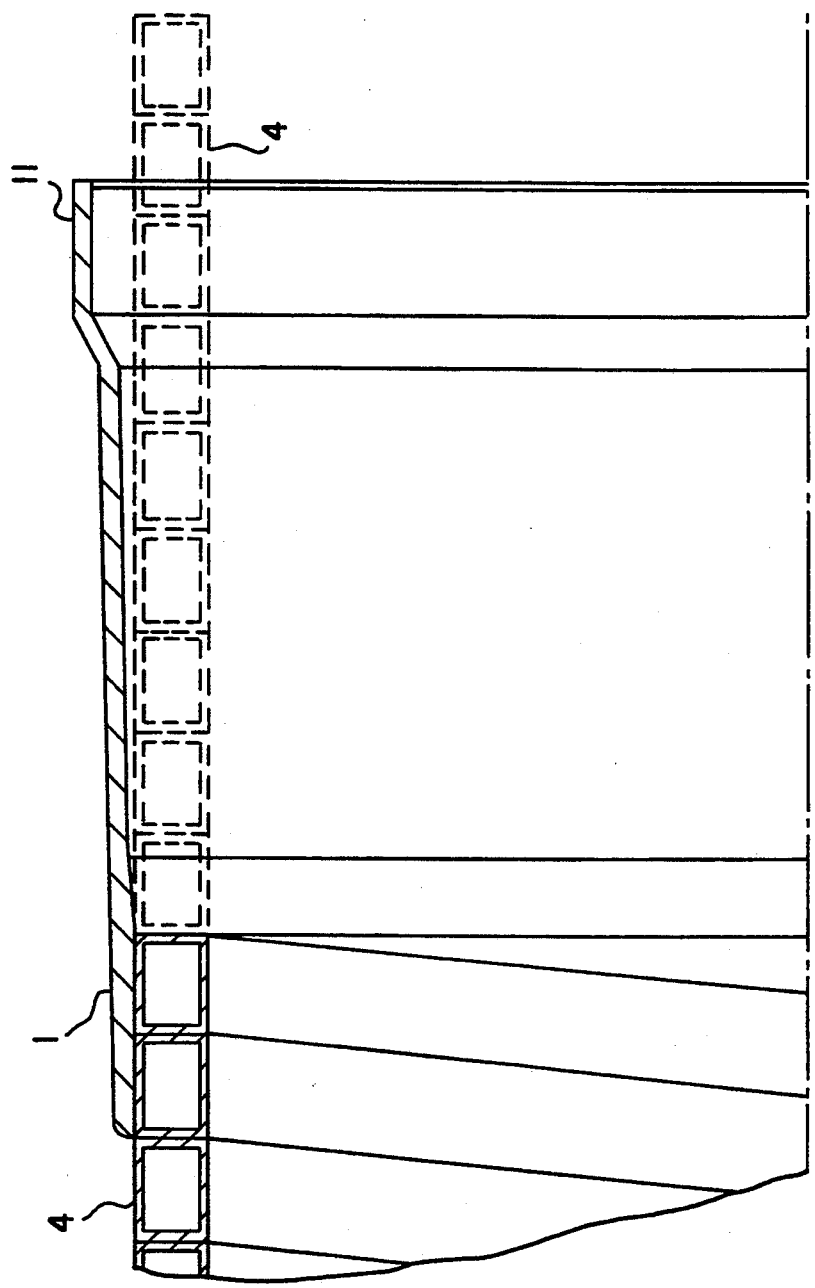

The invention is next described in more detail with reference to the accompanying drawings, in which FIG. 1 shows a scheme representation of a joint pipe manufactured according to the present invention, FIG. 2 shows another example of a joint pipe manufactured according to the invention, and FIG. 3 and 4 show alternative applications of the joint pipe of FIG. 2.

When manufacturing a joint pipe 1, a rotatably driven, heated mandrel 2 with a substantially cylindrical end section 3 is used, upon which a pipe end 4, which is to be provided with the joint pipe 1, is applied. The cylindrical end section 3 has an outer diameter, which corresponds substantially to the inner diameter of the pipe end 4. A radially directed stop surface 5 is between the outer surface of the cyclindrrical end section 3 and the outer surface of a conical main section 6. The end surface of the pipe end 4 is intended to be located against this stop surface 5 during the entire manufacturing process, therefore, the width of the stop surface 5 preferably corresponds to the wall thickness of the pipe end 4 so that a transition as uniform as possible is obtained between the outer surface of the pipe end 4 and the conical main section 6 of the mandrel 2. After the pipe end 4 is applied onto the cylindrical section of the mandrel 2, the mandrel 2 is continuously maintained in rotation and heated up to at least about 100° C. When the mandrel 2 has reached a desired temperature, a melt profile 7 of thermoplast is extruded onto the main section 6 of the rotating mandrel, starting at that end of the mandrel 2, which is located farthest away from the pipe end 4. The extrusion is preferably carried out with an extruder nozzle 8 of a substantially rectangular cross-section, which extruder nozzle 8 may be moved in an axial direction along the mandrel 2. Movement of the extruder nozzle 8 in a direction against the pipe end 4 occurs synchronically with the rotational speed of the mandrel 2 such that the extruder nozzle 8 for each rotation of the mandrel 2 moves in the direction toward the pipe end 4 a distance slightly less than the width of the melt profile such that a certain overlapping is obtained. In this way, a spiral winding of the melt profile 7 around the mandrel 2 and pipe end 4 is obtained, with winding turns located tightly one above the other such that a welding-together of the melt profiles is obtained. For improving the welding together and for obtaining a more uniform surface on the joint pipe, the overlapping is pressed down with a rotating roll 11, which follows the extruder head. The extrusion continues until a desired overlapping between the melt profile 7 and the pipe end 4 is obtained, after which the extruder is stopped, while the rotation of the pipe end 4 and the mandrel 2 may continue. Thus, a uniform transition in the material thickness between the mantle of the pipe end 4 and the joint pipe 1 is obtained.

When the extrusion is stopped, the thermoplastic material in the joint pipe 1 is cooled down by spraying cooling water from the outside upon the extruded joint pipe 1. When the thermoplast material has set, the free end of the joint pipe 1 is cut uniform with a rotating knife 9, whereby an absolutely uniform surface is obtained. Finally, the pipe end 4 with the completed joint pipe 1 removed from the mandrel 2, after which the manufacturing of next joint pipe may be started.

Heating of the mandrel 2 may; for example be performed with a gas blower from inside the mandrel or outside, or in an inductive way from outside the mandrel.

For ensuring the fixing between the pipe end 4 and the mandrel 2 during the different manufacturing steps, the cylindrical section 3 of the mandrel 2 may suitably be of an expansive construction, in which the wall of the section 3 is divided by a number of axially directed gaps 10, and the expansion is achieved in a hydraulic, pneumatic or solely mechanical way via toggle joints.

The welding-together of the spiral wound melt profiles 7 may be intensified by applying a weak mechanical loading on the melt profiles 7; for example by means of a rotating roll 11 for pressing the melt profiles 7 close to each other on the mandrel 2, immediately after application of the windings by the nozzle 8.

The rotating knife 9 comprises preferably a freely rotatable circular blade, which may be pressed in a hydraulic or mechanical way against windings forming the joint pipe 1 extruded on the mandrel 2.

The pipes 4, which can be provided with a joint pipe 1 according to the present invention, are thermoplastic pipes of different types, such as entirely conventional polyethylene pipes or spirally wound pipes of some other type.

The removal of the pipe end 4 with the completed joint pipe 1 from the mandrel 2 is carried out by blowing pressurized air between the mandrel 2 and joint pipe 1, preferably via small gaps or holes contained in the conical section 6 of the mandrel 2, at the same time as a pushing force is directed onto the joint pipe 2 in a direction against the pipe 4.

In FIGS. 2 to 4 a preferable embodiment of the joint pipe 1 is shown. In connection with the manufacturing of this joint pipe, the mandrel further comprises another substantially cylindrical end section with an increased diameter so that the joint pipe 1 manufactured obtains a cylindrical end section 14 extended in a corresponding manner. In joining-together of pipes by means of such a joint pipe 1, the joint pipe may be used, depending on the application area, as such, or, when higher requirements are set on the sealing, a rubber seal 12 according to FIG. 3 or a welding ring 13 according to FIG. 4 may be used. As a result of this possibility, the application range for the joint pipe 1 manufactured according to the invention increases significantly.

We claim:

1. A method for manufacturing a joint pipe from a spirally wound thermoplastic profile (7) at an end of a thermoplastic pipe (4), comprising the steps of:

providing a rotatably driven, heated mandrel (2) having a substantially cylindrical end section (3) corresponding to the inner diameter of the pipe end (4), a radial stop surface (5) corresponding to the wall thickness of the pipe end (4) and a conical section (6) wherein the radial stop surface (5) is between the outer surface of the end section (3) and the outer surface of the conical section (6), pushing the thermoplastic pipe end (4) onto the end section (3) of the mandrel (2) such that a uniform transition between the outer surface of the pipe end and the conical section is obtained, forming a joint pipe (1) on the pipe end (4) by extruding a melt profile (7) made of thermoplastic material onto the mandrel (2) beginning at that end of the mandrel (2), which is remote from the pipe end (4) and, spirally winding the melt profile (7) around the conical section (6) and around the pipe end (4) while rotating the mandrel (2) and pipe end (4) such that adjacent windings of the melt profile overlap, terminating the extruding step while continuing to rotate the mandrel (2) and the pipe end (4), spraying cooling water over the joint pipe (1), cutting a free end of the joint pipe (1) with a rotating knife (9), and removing the pipe end (4) with the joint pipe (1) from the mandrel (2).

2. A method according to claim 1, wherein the mandrel (2) is heated to at least 100° C. before melt profile is extruded.

3. A method according to claim 1 or 2, including the step of fixing the pipe end (4) around the cylindrical section (3) of the mandrel (2) by temporarily extending said cylindrical section (3).

4. A method according to claim 1 or 2 including the step of subjecting the extruded melt profile (7) to a weak mechanical loading by means of a rotating roll for intensifying a welding-together of the overlapped melt profile windings (7).

5. A method according to claim 1 or 2 wherein the rotating knife (9) comprises a freely rotating circular blade, which is pressed against the thermoplastic material of the joint pipe (1) for cutting the free end of the joint pipe.

6. A method according to claim 1 or 2, wherein the pipe thermoplastic pipe containing the pipe end (4) is a polyethylene pipe or a spirally wound thermoplastic pipe.

7. A method according to claim 1 or 2, including the step of removing the pipe end (4) with the joint pipe (1) from the mandrel (2) by blowing pressurized air between the mandrel (2) and the joint pipe (1) while directing a pushing force onto the joint pipe (1) in a direction against the pipe (4).

8. A method according to claim 1 or 2, wherein the mandrel further comprises another substantially cylindrical end section and the melt profile is wound about the another end section so that the joint pipe has an extended cylindrical end section (14) which permits application of a sealing ring (12) or a welding ring (13) to the inside surface of the joint pipe.

* * * * *